(12) United States Patent
Bidiville

(10) Patent No.: US 7,623,116 B1
(45) Date of Patent: Nov. 24, 2009

(54) ROLLER WITH MULTIPLE FORCE SENSE LEVELS

(75) Inventor: Marc Bidiville, Monaco (MC)

(73) Assignee: Logitech Europe S.A. (CH)

( * ) Notice: Subject to any disclaimer, the term of this patent is extended or adjusted under 35 U.S.C. 154(b) by 744 days.

(21) Appl. No.: 10/857,674

(22) Filed: May 28, 2004

Related U.S. Application Data

(60) Provisional application No. 60/497,122, filed on Aug. 22, 2003.

(51) Int. Cl.
*G09G 5/08* (2006.01)

(52) U.S. Cl. ............... 345/163; 345/159; 345/161; 345/167; 200/5 A; 200/5 R; 200/6 A; 463/37; 463/38; 715/856; 715/863

(58) Field of Classification Search ......... 345/156–161, 345/163–166; 463/37–38; 200/5 R, 5 A, 200/6 A; 715/856, 863
See application file for complete search history.

(56) References Cited

U.S. PATENT DOCUMENTS

| | | | |
|---|---|---|---|
| 6,700,564 B2* | 3/2004 | McLoone et al. | 345/156 |
| 6,809,275 B1* | 10/2004 | Cheng et al. | 200/14 |
| 7,042,441 B2* | 5/2006 | Adams et al. | 345/163 |
| 7,075,516 B2* | 7/2006 | Bohn | 345/163 |
| 7,079,110 B2* | 7/2006 | Ledbetter et al. | 345/156 |
| 7,187,358 B2* | 3/2007 | Ledbetter et al. | 345/156 |
| 7,199,785 B2* | 4/2007 | Ledbetter et al. | 345/156 |

* cited by examiner

*Primary Examiner*—Henry N Tran
(74) *Attorney, Agent, or Firm*—Townsend and Townsend and Crew LLP

(57) ABSTRACT

A roller device including a roller wheel configured to control scrolling of a graphical object along a first axis if the roller wheel is rotated by a user; a first sensor adjacent to a first side of the roller wheel; and a second sensor adjacent to a second side of the roller wheel; wherein the first and second sensors are configured to control a scrolling rate of the graphical object along a second axis.

49 Claims, 4 Drawing Sheets

ROLLER WITH MULTIPLE FORCE SENSE LEVELS

This application claim priority to U.S. Provisional Patent Application No. 60/497,122, filed Aug. 22, 2003, titled "MOUSE ROLLER WITH HORIZONTAL SCROLLING" and is incorporated by reference herein in its entirety for all purposes.

BACKGROUND OF THE INVENTION

The present invention relates to rollers for input devices, and in particular relates to a roller configured to provided variable speed scrolling in response to varying forces applied to the roller.

Traditional input devices, such as mice and track balls, do not provide x-scrolling of graphical displays displayed on a monitor. X-scrolling refers to the left and right (or horizontal) scrolling directions of graphical objects displayed on a monitor as compared with the up and down (or vertical) scrolling directions. The up and down scrolling directions on a monitor are traditionally referred to as the y-scrolling directions. Scrolling control along the x-axis of a monitor is desired for scrolling objects, such as a page of text or the like, that extend beyond the horizontally displayable width of the monitor. Traditionally, x-scrolling has been controlled by positioning a pointing device on a left or right x-scrolling button and "clicking" on one of the buttons or selecting an x-scrollbar with a pointer and dragging the x-scrollbar in an x-axis direction. These traditional x-scrolling techniques require multiple user manipulations of traditional pointing devices and graphical user interface (GUI) tools to effect x-scrolling and tend to be time consuming and awkward.

Other control devices designed to control scrolling include devices described in U.S. patent application Ser. No. 10/184,000 (U.S. Patent Application Publication No. 2003/0025673), filed Feb. 6, 2003, titled "Input Device Including a Wheel Assembly For Scrolling an Image In Multiple Directions," and in U.S. patent application Ser. No. 09/843,794 (U.S. Patent Application Publication No. 2002,0158844), filed Apr. 30, 2001, titled "Input Device Including a Wheel Assembly For Scrolling an Image In Multiple Directions," owned by Microsoft Corporation.

It is desirable to have an improved input device that provides y-scrolling, x-scrolling, and that is easy to use and manufacture.

BRIEF SUMMARY OF THE INVENTION

The present invention provides a number of embodiments of a rotatable member that can be mounted in a mouse or input device that allows both rotations of the rotatable member for vertical scrolling and response to lateral forces for variable speed horizontal scrolling.

According to one embodiment, a roller device includes a roller wheel configured to control scrolling of a graphical object along a first axis if the roller wheel is rotated by a user; a first sensor adjacent to a first side of the roller wheel; and a second sensor adjacent to a second side of the roller wheel; wherein the first and second sensors are configured to control a scrolling rate of the graphical object along a second axis. According to a specific embodiment, the scrolling rate includes at least a first scrolling rate and a second scrolling rate. According to another specific embodiment, the first sensor is a first two-stage button and the second sensor is a second two-stage button, the first and second two stage buttons are configured to control scrolling along the second axis at a first scrolling rate if either the first two stage button or the second two stage button is in a first activation state, and the first and second two stage buttons are configured to control scrolling along the second axis at a second scrolling rate if either the first two stage button or the second two stage button is in a second activation state. According to another specific embodiment, the first activation stage of either the first or second two stage button is configured to be activated if the roller wheel is pushed laterally with a first amount of force, the second activation stage of either the first or second two stage button is configured to be activated if the roller wheel is pushed laterally with a second amount of force, and the second amount of force is larger than the first amount of force. According to another specific embodiment, the roller wheel is configured to pivot in a first direction to activate the first sensor and pivot in a second direction to activate the second sensor. According to another specific embodiment, the first pivot direction and the second pivot direction are perpendicular to a rotation direction of the roller wheel. According to another specific embodiment, the roller wheel is configured to translate in a first direction to activate the first sensor and translate in a second direction to activate the second sensor. According to another specific embodiment, the first direction and the second direction are lateral directions. According to another specific embodiment, the first direction and the second direction are perpendicular to a rotation direction of the roller wheel. According to another specific embodiment, the first sensor is configured to control scrolling along a positive direction of the second axis at a first rate if the roller is pivoted in a first direction by a first lateral amount of force, the second sensor is configured to control scrolling along a negative direction of the second axis at the first rate if the roller is pivoted in a second direction by the first amount lateral force, the first sensor is configured to control scrolling along the positive direction of the second axis at a second rate if the roller is pivoted in the first direction by a second lateral amount of force, and the second sensor is configured to control scrolling along the negative direction of the second axis at the second rate if the roller is pivoted in the second direction by the second amount lateral force. According to another specific embodiment, the first sensor is a first two stage button, and the second sensor is a second two stage button. According to another specific embodiment, the first sensor includes a first one stage button and a first force detection device that are mechanically coupled, and the second sensor includes a second one stage button a second force detection device that are mechanically coupled. According to another specific embodiment, the first sensor is a first force detection device, and the second sensor is a second force detection device. According to another specific embodiment, the first and second force detection devices are configured to control scrolling at a first rate along the second axis if either the first or second force detection devices detect a first amount of force, and the first and second force detection devices are configured to control scrolling at a second rate along the second axis if either the first or second force detection devices detect a second amount of force greater than the first amount of force. According to another specific embodiment, the second rate increases with an increased second amount of force. According to another specific embodiment, the second rate is a function of the second amount of force. According to another specific embodiment, the second rate is proportional to the second amount of force. According to another specific embodiment, the roller wheel is configured to pivot to transfer forces to the first force detection device and the second force detection device. According to another specific embodiment, the graphical object is displayed on a computer display.

According to another specific embodiment, the roller device further includes an axle coupled to the roller wheel configured to transfer lateral forces to the first sensor and the second sensor placed on the roller wheel by the user. According to another specific embodiment, the roller wheel is configured to laterally translate under the lateral forces to activate the first sensor and the second sensor. According to another specific embodiment, the first axis is the y-axis of a monitor, and the second axis is the x-axis of a monitor.

According to another embodiment, a roller device includes a roller; a first detector configured to be activated if the roller is moved in a first direction; and a second detector configured to be activated if the roller is moved in a second direction, wherein the first detector and second detector are configured to control a scrolling rate of a graphical object based on an amount of force placed on the roller by a user. According to another specific embodiment, the roller device further comprising a pivot link coupled to the roller, wherein the movement is pivoting movement. According to another specific embodiment, the movement is translational movement.

According to another embodiment, a roller device includes a roller configured to pivot; a pivot link coupled to the roller configured to provide roller pivoting under an externally applied force; a first two-stage button configured to be activated if the roller is pivoted in a first direction and configured to control a first direction of x-scrolling of a graphical object, wherein the first direction of x-scrolling is at a first scrolling rate if the first two-stage button is in a first stage and is at a second scrolling rate if the first two-stage button is in a second stage; and a second two-stage button configured to be activated if the roller is pivoted in a second direction and configured to control a second direction of x-scrolling of a graphical object, wherein the second direction of x-scrolling is at the first scrolling rate if the second two-stage button is in the first stage and is at a second scrolling rate if the second two-stage button is in the second stage.

According to another embodiment, a roller device includes a roller configured to laterally translate under an external force applied by a user; a first two-stage button configured to be activated if the roller is laterally translated in a first direction and configured to control a first direction of x-scrolling of a graphical object, wherein the first direction of x-scrolling is at a first scrolling rate if the first two-stage button is in a first stage and is at a second scrolling rate if the first two-stage button is in a second stage; and a second two-stage button configured to be activated if the roller is laterally translated in a second direction and configured to control a second direction of x-scrolling of a graphical object, wherein the second direction of x-scrolling is at the first scrolling rate if the second two-stage button is in the first stage and is at a second scrolling rate if the second two-stage button is in the second stage.

According to another embodiment, a method is provided for scrolling a graphical object along a first axis and a second axis. The method includes scrolling the graphical object along the first axis if a roller wheel is rotated by a user; scrolling the graphical object along the second axis at a first rate if one of a first sensor or a second sensor detects a first amount of lateral force placed on the roller wheel by a user; and scrolling the graphical object along the second axis at a second rate if one of the first sensor or the second sensor detects a second amount of lateral force placed on the roller wheel by the user. According to a specific embodiment, the first force is less than the second force, and the first rate is less than the second rate. According to another specific embodiment, the method further includes tilting the roller wheel in a first direction to activate the first sensor, and tilting the roller wheel in a second direction to activate the second sensor. According to another specific embodiment, the method further includes laterally translating the roller wheel in a first direction to activate the first sensor, and laterally translating the roller wheel in a second direction to activate the second sensor. According to another specific embodiment, the first sensor and the second sensor are configured to detect the first amount lateral and the second amount of lateral force without tilting or translating of the roller wheel.

For a further understanding of the nature and advantages of the invention, reference should be made to the following detailed description taken in conjunction with the accompanying figures and claims.

DETAILED DESCRIPTION OF THE INVENTION

Figure 1A:
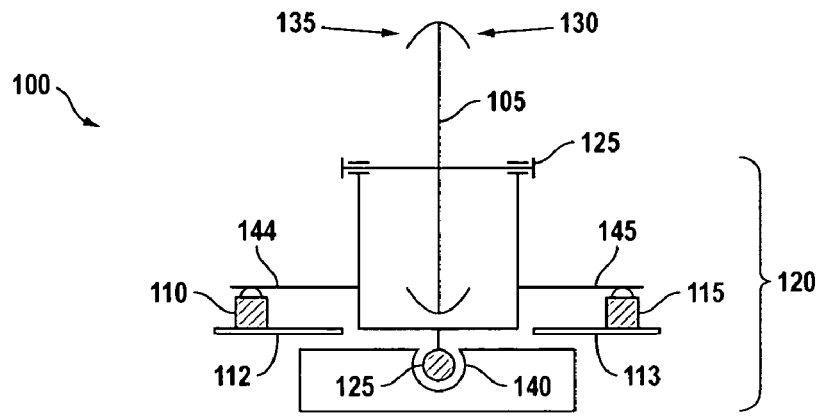
FIG. 1A is a simplified schematic of a tiltable roller structure according to an embodiment of the present invention.

FIG. 1A is a simplified schematic of a tiltable roller structure 100 according to an embodiment of the present invention. Tiltable roller structure 100 includes a roller 105, a first button 110 coupled to a first button support structure 112, a second button 115 coupled to a second button support structure 113, and a support structure 120 that allows the roller to both rotate and pivot. The roller is configured to rotate on a lateral-axle structure 125 and pivot left and right (indicated by arrows 130 and 135) on a pivot link 140. Button support structures 112 and 113 might be coupled to axle support structure 142 as shown, and each of these structures may be coupled to, or form a portion of, the bottom case (not shown) of a control device, such as a mouse or the like. The axis of rotation of the lateral axis structure and the roller, as shown in FIG. 1A, is perpendicular to the plane of the page and is located at about the lateral-axle structure. The roller may be rotated by a user using a finger, for example, to push on the roller thereby causing rotation. The roller structure may include a number of means (not shown) to encode roller rotations, such as electro-optical encoding means, electro-mechanical encoding means or the like. Roller rotation encoding means are well known to those of skill in the art and will not be described in detail herein. Encoded rotations of the roller may be used to control y-axis scrolling of graphical objects 146 (see FIG. 1D) displayed on a monitor 143, such as a computer monitor. For example, encoded rotations of the roller may be used to effect y-axis screen scrolling of text pages or the like.

Figure 1B:
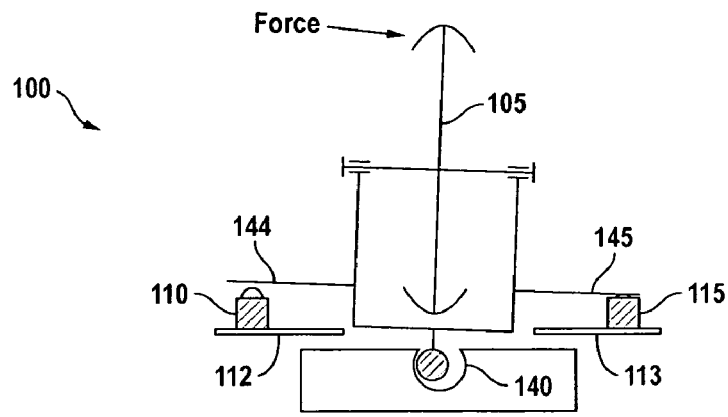
FIG. 1B shows a roller pushed to the right and a right button activated.

Roller 105 may be tilted left or right by a user using a finger to laterally push on the roller in a left or right direction (indicated by arrows 130 and 135, respectively). Laterally pushing on the roller to the left causes button 110 to be activated by activation arm 144, and pushing on the roller to the right causes button 115 to be activated by activation arm 145. FIG. 1B shows roller 105 pushed to the right and button 115 activated. A restoring force may be applied by the buttons or other devices (not shown) to return the roller to a neutral position subsequent to being pushed to the left or right. Buttons 110 and 115 are configured to control x-scrolling (left and right scrolling) of graphical objects, such as text pages or the like, that are displayed on a monitor. According to one embodiment, buttons 110 and 115 are both two level buttons that have first and second activation states. The first activation state may be activated by a user pressing on roller 105 with a first force, and the second activation state may be activated by the user pressing on the roller with a second force that is greater than the first force. The two activation states may be used for incremental control of graphical objects displayed on a computer monitor. For example, in the first activation state, the buttons may be configured to provide x-scrolling at a first scrolling rate, and in the second activation state, the buttons may be configured to provide x-scrolling at a second scrolling rate. The second scrolling rate may be higher than the first scrolling rate. While FIG. 1A shows roller structure 100 as including pivot link 140 that provides for left and right pivoting of roller 105, other pivot structures may be used to provide for pivoting and activation of buttons 110 and 115. Those of skill in the art will readily recognize other pivoting structures of use to control pivoting roller 105.

Figure 1C:
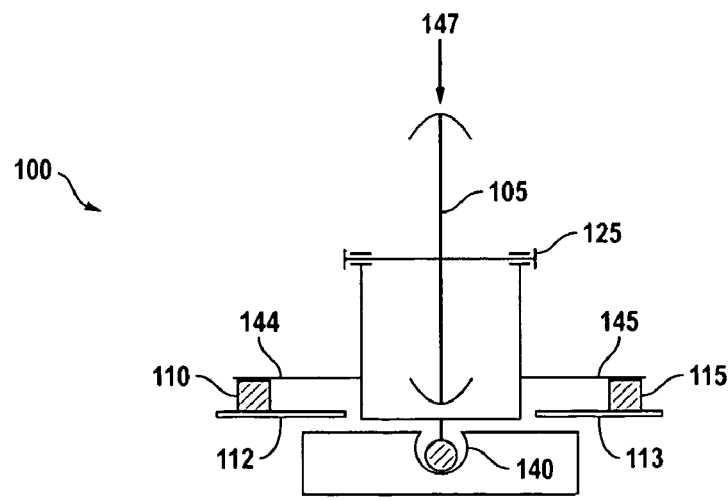
FIG. 1C is a simplified schematic of tiltable roller structure according to another embodiment of the present invention.

FIG. 1C is a simplified schematic of tiltable roller structure 100' according to another embodiment of the present invention. Tiltable roller structure 100' differs from tiltable roller structure 100 described above in that both button 110 and button 115 may be activated at essentially the same time by a user pressing down on roller 105. Buttons 110 and 115 may also be activated discretely by the user applying lateral forces on the roller as described above. According to one embodiment, axle support structure 142 is coupled to a support structure 149 (e.g., a bottom housing of a control device) by springs 147. Roller 105 is configured to be pressed downward with respect to the button supports to provide for the essentially simultaneous activation of buttons 110 and 115. While axle support structure 142 is described as being coupled to support structure 149 by springs 147, the support structure might by coupled to the support structure by slides (not shown) that are configured to guide the downward and upward travel of the structure and provide a return force to the axle support structure. According to one embodiment, if button 110 and button 115 are both activated by pressing (or clicking) on roller 105, a control signal is generated to control the graphical manipulation of one or more graphical objects and/or to change an operation characteristic of an input device.

According to one embodiment, if roller 105 is pressed and both button 110 and button 115 are activated, an operation characteristic of input device 175 may be changed from a first operation characteristic to a second operation characteristic. The first operation characteristic of the input device, for example a mouse, may be cursor control, and the second operation characteristic may be scrolling control. Alternatively, if both button 110 and button 115 are essentially simultaneously activated (or "clicked"), the control signal associated with the essentially simultaneous activation may include the selection of a graphical objection on a display, for example, for highlighting the graphical object for cutting, pasting or other functions. While specific examples are described for use of the signal generated by essentially simultaneous activation of buttons 110 and 115, it should be understood that any control-device function that is associated with clicking a roller may be controlled by the generated signal.

Figure 1D:
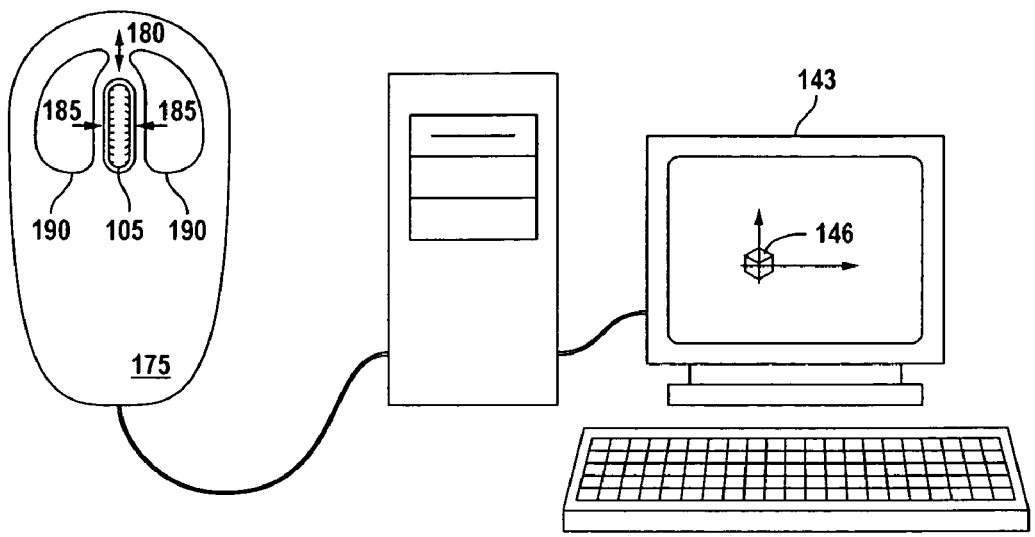
FIGS. 1D and 1E are top and side views respectively of a roller structure according to another embodiment of the present invention.
Figure 1E:
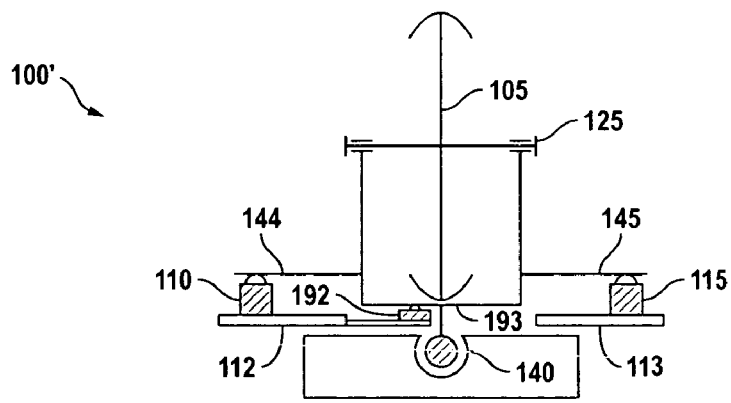

FIGS. 1D and 1E are top and side views respectively of a roller structure 100" according to another embodiment of the present invention. Roller structure 100" differs from roller structure embodiments described above in that roller 105 is configured to pivot about a pivot link 191 that is disposed behind lateral-axle structure 125. According to one embodiment, pivot link 191 is coupled to a cantilever arm 192 that is configured to pivot about the pivot link. Cantilever arm 192 is configured to pivot roller 105 right, left, and forward. Roller 105 and cantilever arm 192 is configured to pivot right and left under lateral forces (indicated by arrows 130 and 135) applied to the roller, and is configured to pivot forward under a downward force (indicated by arrow 137). A spring 193 is coupled to a front end of cantilever arm 193 and a support structure (not shown, e.g., a bottom housing of the control device) that is configured to support the spring from below. Spring 193 is configured to provide a return force to the cantilever arm if the cantilever arm is rotated right, left, or forward. Button 110 and button 115 are coupled to a front portion of the cantilever arm. The buttons might be disposed on the left and right sides of spring 193 and coupled to the ends of a frontal t-section 194 of the cantilever arm. Buttons 110 and 115 may be configured to control graphical objects as described above, including left and right scrolling if the buttons are discretely activated, and may provide a clicking function (described above) if the buttons are activated at the same time. It should be understood that the forward and back orientations used to describe the elements are roller 100" are chosen for convenience. For example, while the pivot link is described as being disposed behind lateral-axle structure 125, this does not imply a particular orientation of roller structure 100" in a control device, as the pivot link may be oriented toward a front end or a back end of a control device (e.g., a mouse).

Figure 1F:
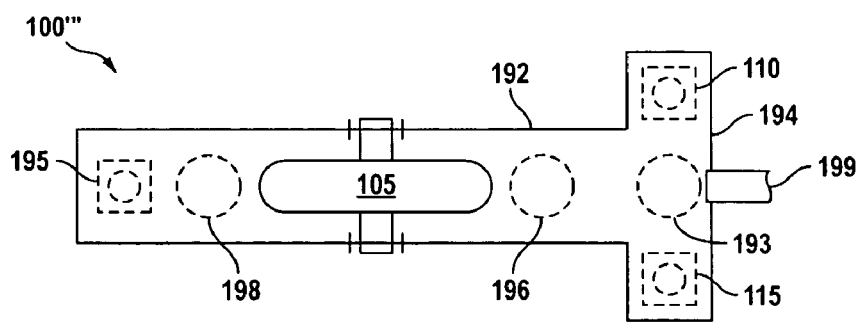
FIGS. 1F and 1G are top and side views respectively of a roller structure according to another embodiment of the present invention.
Figure 1G:
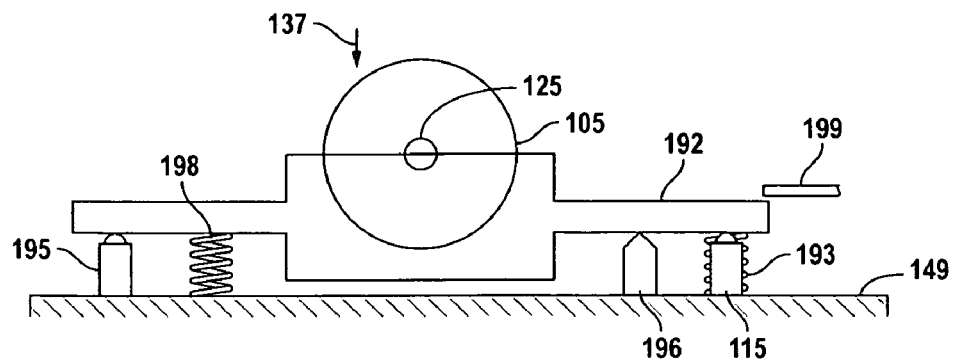

FIGS. 1F and 1G are top and side views respectively of a roller structure 100''' according to another embodiment of the present invention. Roller structure 100''' differs from roller structure embodiments described above in that roller structure 100''' includes a button 195, and roller 105 is configured to pivot about a pivot link 196 that is disposed between lateral-axle structure 125 and frontal t-section 194 of cantilever arm 192. According to one embodiment, roller 105 and cantilever arm 192 are configured to pivot right, left, and back. Roller 105 and cantilever arm 192 are configured to pivot right and left under lateral forces (indicated by arrows 130 and 135) applied to the roller, and are configured to pivot back under a downward force (indicated by arrow 137). Spring 193 is coupled to the front end of cantilever arm 192 is configured to provide a return force to the cantilever arm if the cantilever arm is rotated right or left. A spring 198 is coupled to the cantilever arm and the support and is disposed between the roller and button 195 and is configured to provide a return force to the roller and cantilever arm if the roller pressed downward. Various guide means not shown may provide for guidance of the cantilever arm during pivoting. Those of skill in the art will know to provide such guide means. Buttons 110 and 115 may be configured to control graphical objects as described above, for example if the roller is tilted right for left. Button 195 may be configured to provide one or more of the functions described above that are associated with the roller being clicked. For example, button 195 may provide the function described above for the essentially simultaneous activation of buttons 110 and 115. While spring 198 is shown disposed between, roller 105 and button 195, the spring may also be disposed behind both roller 105 and buttons 195. According to one embodiment, one or more structures 199 (e.g., a stop) may be disposed above cantilever arm 192 to limit the upward travel of the arm.

Figure 1H:
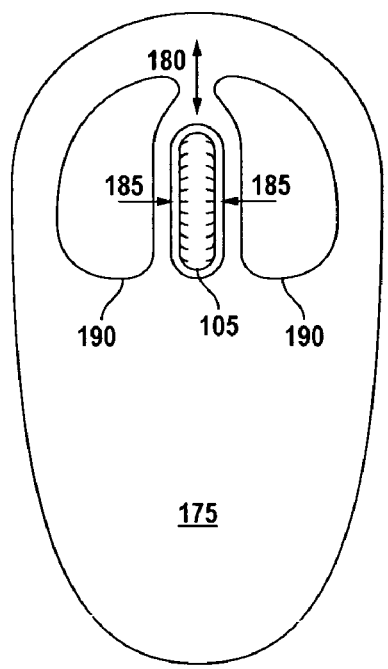
FIG. 1H is a simplified schematic of a mouse that includes a tiltable roller structure.

The roller structures described herein may be incorporated in a variety of input devices, such as a mouse, a track ball, a keyboard, a keypad, a touch pad, gamepad, joystick, steering wheel or the like. FIG. 1H is a simplified schematic of a mouse 175 that includes a tiltable roller structure according to one of the embodiments of the present invention. Arrow 180 indicates the rotation directions of roller 105 and arrows 185 indicate the left and right pivot directions of the roller. Mouse 175 might include control buttons 190 and other x-y position controllers, such a roller ball and roller ball encoder or an optical x-y encoder.

Figure 2:
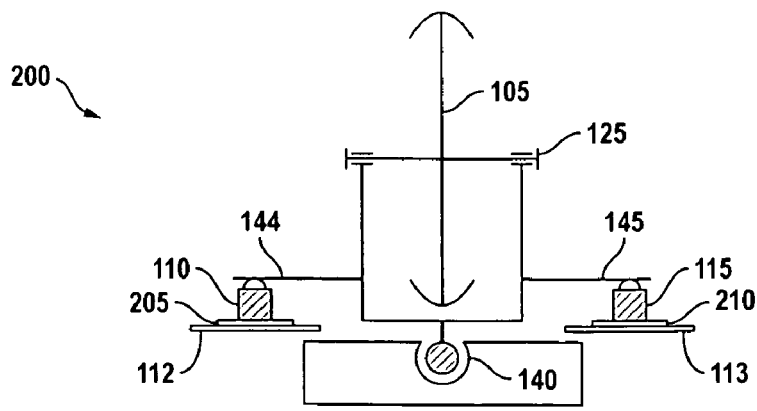
FIG. 2 is a simplified schematic of a roller structure according to another embodiment of the present invention.

FIG. 2 is a simplified schematic of a roller structure 200 according to another embodiment of the present invention. The same numeral scheme used above to identify structures of roller structure 100 will be used to identify similar structures of roller structure 200. Roller structure 200 differs from roller structure 100 described above, in that roller structure 200 includes force detection devices 205 and 210 and includes buttons 110' and 115' that are single stage buttons and have single activation states. The force detection devices are analog force sensors. That is the force sensors may be configured to generate a voltage signal or current signal that is a function of (e.g., proportional to) the force applied to the roller. The force detection devices might include strain gauges, a solid state sensor, piezoelectric devices, such as a piezoresistivity device, such as a piezoresistivity conductive polymer that changes resistance in a predictable manner with the application of a force at its surface. Piezoresistivity conductive polymers of use might include those manufactured by Interlink Electronics of Carpinteria Calif., under the trademark Force Sensing Resistors™. According to one embodiment, force detection device 205 is disposed between button 110' and a first button support structure 112, and force detection device 210 is disposed between button 115' and a second button support structure 113. While the force detection devices are shown in FIG. 2 as being disposed below the buttons, the force detection devices may alternately be disposed above the buttons and below the activation arms. According to one embodiment, force detection devices 205 and 210 are configured to control the x-scrolling rate based on the level of force detected by the force detection devices. For example, as a user increases the amount of force laterally exerted on roller 105, force detection device 205 or 210 are configured to detect a corresponding increase in applied force and correspondingly increase the x-scrolling rate. According to one embodiment, the x-scrolling rate is not affected by the force detection devices until either button 110' or 115' is activated. That is, regardless of the pressure detected by the force detection devices, x-scrolling is not commenced until one of buttons 110' and 115' is activated. According to one embodiment, x-scrolling is initiated if the force detected by the force detection devices is greater than a threshold force. Implementing a threshold force to initiate x-scrolling inhibits inadvertent x-scrolling that is not intended by the user. The force detection devices may be force sensing resistors that might have flexible electrical connections, piezoelectric devices, solenoid type devices or other devices configured to detect a range of applied forces. According to some embodiments, analog or digital signal generated by the roller structure may be used to control scrolling and the scrolling rates.

According to various embodiments of the present invention, each of the roller structures 100', 100", 100'" described above includes a force detection device 205 and a single stage button 110' in place of two stage button 110, and includes a force detection device 210 and a single stage button 115' in place of two stage button 115, such that the force detection devices and single stage buttons are configured to provide the functions described above with respect to roller structure 200.

Figure 3:
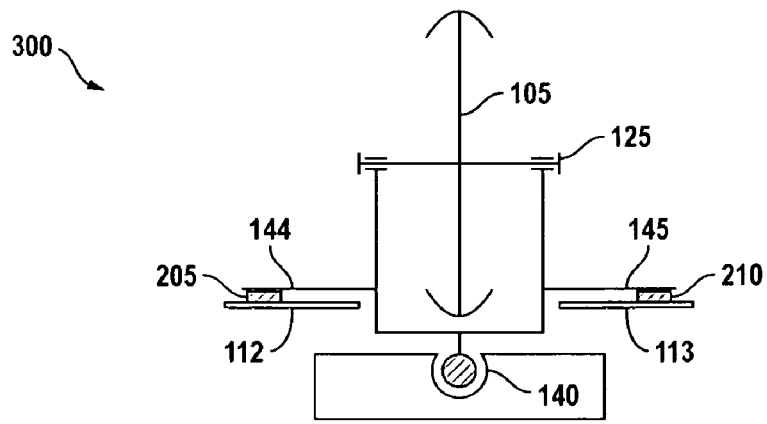
FIG. 3 is a simplified schematic of a roller structure according to another embodiment of the present invention.

FIG. 3 is a simplified schematic of a roller structure 300 according to another embodiment of the present invention. The same numeral scheme used above to identify structures of roller structure 100 will be used to identify similar structures of roller structure 300. Roller structure 300 differs from roller structure 100 described above, in that roller structure 300 includes left and right force detection devices 205 and 210, respectively, that are configured to replace buttons 110 and 115 or buttons 110' and 115'. According to one embodiment, the force detection devices are configured to detect forces placed on the scroll wheel with no tilting of the scroll wheel or a relatively small amount of tilt (e.g., less than or equal to about 2°). The force detection devices may be configured to control x-scrolling at a first scrolling rate (e.g., along the positive or negative x-axis) if a first amount of force (e.g., left or right force) is placed on the scroll wheel. And if a second amount of force greater than the first amount of force is places on the scroll wheel, the force detection devices may be configured to control x-scrolling at a second scrolling rate. The second scrolling rate may be greater than the first scrolling rate. According to another embodiment, if forces greater than the first force are detected by the force detection devices, the x-scrolling rate may be increased, for example, proportionally to the amount of force detected that exceed that first force. According to another embodiment, the scrolling rate is generally proportional to the left and right forces detected by the force detection devices (e.g., these forces do not need to be greater than a threshold force). The term proportional as referred to herein may include direct proportionalities or proportionalities that are exponential.

Similar to roller structure 100, the roller of roller structure 300 may be configured to be pressed to activate both the left and right force detection devices essentially simultaneously to control graphical objects as described above with respect to roller structure 100. According to some embodiments, roller structure 300 includes a button 192 (see FIG. 1E) configured to be activated if the roller is pressed to control graphical objects as described above with respect to roller structure 100'.

Figure 4:
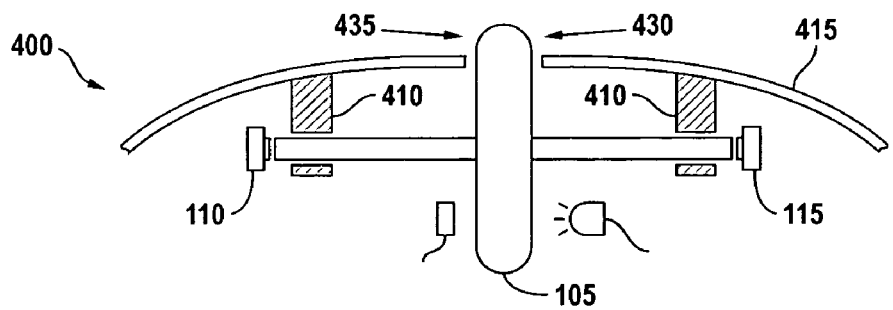
FIG. 4 is a simplified schematic of a roller structure according to another embodiment of the present invention.

FIG. 4 is a simplified schematic of a roller structure 400 according to another embodiment of the present invention. The same numeral scheme used above to identify structures of roller structure 100 will be used to identify similar structures of roller structure 400. Roller structure 400 differs from roller structure 100 in that roller 105 of roller structure 400 is laterally translatable as compared with being configured to pivot. Roller 105 of roller structure 400 is mounted on an axle 405 that is supported by bearings 410. The axle is configured to rotate within the bearing and is configured to laterally translate within the bearing. The bearings may be mounted to an inside surface of case 415. Roller structure 400 further includes a left button 110 and a right button 115. Roller 105 is configured to rotate to encode signals for y-scrolling. In the particular embodiment shown in FIG. 4, an LED 412 is configured to illuminate slits (not shown) in the roller and a photodetector 414 is configured to detect increases and decreases in illumination to encode roller rotations. While the particular embodiment shown in FIG. 4 includes an LED and photodetector configured to encode roller rotations, rotations of the roller may be encoded by other optoelectronic device, electro-mechanical device or the like. Roller rotations encoding is well understood by those of skill in the art and will not be discussed in further detail. According to some embodiments, roller structure 300 includes a button 192 (see FIG. 1E) configured to be activated if the roller is pressed to control graphical objects as described above with respect to roller structure 100'.

Roller 105 may be laterally translated by a user using a finger, for example, to laterally push (indicated by arrows 430 and 435) on the roller to laterally translate the roller and axle to activate buttons 110 and 115. Roller 105 is configured to be laterally translated to activate buttons 110 and 115 for x-scrolling. In the laterally translated position, the roller may be returned to a neutral position by buttons 110 and 115 or other means, such as springs or the like, configured to provide a restoring force to the roller.

According to one embodiment, buttons 110 and 115 are two-stage activation buttons as described above and are configured to control an x-scrolling rate of displayed graphical objects, such as text pages. These two-stage activation buttons may be configured to control scrolling and scrolling rates as described above, for example, with respect to FIG. 2. While buttons 110 and 115 are shown as being disposed at the ends of the axle to detect lateral translation of the roller, the buttons may be disposed in a number of locations to detect lateral translations of the roller. For example, the buttons might be configured to contact the roller directly or contact a hub of the roller to detect lateral translations of the roller. According to some embodiments, buttons 110 and 115 are single stage activation buttons and force detection devices (not shown) are disposed under or above the buttons and are configured to control the x-scrolling rate based on an amount of force detected by the force detection devices. For example, the scrolling rate may be proportional to the force detected by the force detection devices. Or, the scrolling rate may be proportional to detected forces that exceed a threshold force level. According to another embodiment, force detection devices might be used in place of buttons 110 and 115 to control x-scrolling and the x-axis scrolling rate. The force detection devices may be configured to control scrolling and scrolling rate as described above, for example, with respect to FIG. 3. For example, the force detection devices might be configured to initiate x-scrolling at an initial scrolling rate if an initial force greater than a threshold force is detected and increase the scrolling rate as increasing forces are detected. According to some embodiment, the roller wheel and axle may be configured not to translate to or to translate by a relatively small amount to transfer lateral pushing forces to the force detection devices. Minimizing lateral travel (e.g., no lateral travel) of the roller, may serve reduce finger and hand strain.

Figure 5:
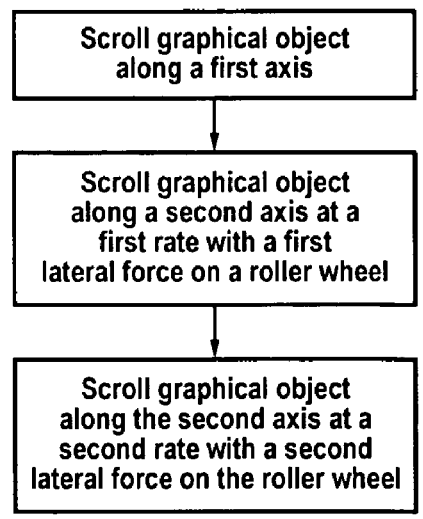
FIG. 5 is a high level flow chart having steps for scrolling a graphical object along a first axis and a second axis, such that a scrolling rate along the second axis is variable.

FIG. 5 is a high level flow chart having steps for scrolling a graphical object along a first axis and a second axis, such that a scrolling rate along the second axis is variable. At 500, a graphical object is scrolled along the first axis if a roller wheel of a roller device is rotated by a user. At 505, the graphical object is scrolled along the second axis at a first rate if one of a first sensor or a second sensor detects a first amount of lateral force placed on the roller wheel by a user. At 510, the graphical object is scrolled along the second axis at a second rate if one of the first sensor or the second sensor detects a second amount of lateral force placed on the roller wheel by the user. The first amount of lateral force may be greater than the second amount of lateral force. And the first rate of scrolling may be less than the second rate of scrolling. The foregoing described method outlines an exemplary embodiment of a method according to an embodiment of the present invention.

Those of skill in the art will recognize that fewer, more, or alternate steps may be included in the above outlined steps to effect the method.

The above-described arrangements of apparatus and methods are merely illustrative of applications of the principles of this invention and many other embodiments and modifications may be made without departing from the spirit and scope of the invention as defined in the claims. For example, analog switches may be used in place of two stage switches described herein to control x-scrolling. Additionally switches having more than two states may be used for additional functional control, such as z-scrolling (e.g., expanding/zooming-in and/or showing different z-axis cross-sections). Moreover, while the two stage switches, the force detection device, and the one stage switches coupled to force detection device have been described herein as configured to control scrolling, these device may also be configured to control other graphical functions, such as the manipulation of three-dimensional objects. For example, tiltable or translatable rollers described herein might be configured to control position (e.g., x, y, or z position) of three-dimensional objects or control orientation (e.g., rotation about the x, y, or z axes) of a three-dimensional object. The scope of the invention should, therefore, be determined not with reference to the above description, but instead should be determined with reference to the appended claims along with their full scope of equivalents.

What is claimed is:

1. A roller device comprising:
 a roller wheel configured to control scrolling of a graphical object displayed on a monitor along a first axis if the roller wheel is rotated by a user;
 a first sensor adjacent to a first side of the roller wheel; and
 a second sensor adjacent to a second side of the roller wheel;
 wherein:
  the roller wheel is configured to be tilted toward the first side to activate the first sensor,
  the roller wheel is configured to be tilted toward the second side to activate the second sensor, wherein tilting directions of the rolling wheel to the first side and the second side are perpendicular to a rotation direction of the roller wheel being rotated,
  the roller wheel is configured to be pressed downward to activate the first sensor and the second sensor,
  if the first or second sensor is activated, the first and second sensors are configured to control a scrolling rate of the graphical object along a second axis, and
  if the first and second sensors are activated, the first and second sensors are configured to change a control characteristic of the roller device being rotated from a first characteristic to a second characteristic, and
  the first control characteristic of the roller device being rotated is for cursor control and the second control characteristic of the roller device being rotated is for scrolling control.

2. The device of claim 1, wherein the scrolling rate includes at least a first scrolling rate and a second scrolling rate.

3. The device of claim 1, wherein:
 the first sensor is a first two-stage button and the second sensor is a second two-stage button,
 the first and second two stage buttons are configured to control scrolling along the second axis at a first scrolling rate if either the first two stage button or the second two stage button is in a first activation state, and
 the first and second two stage buttons are configured to control scrolling along the second axis at a second scrolling rate if either the first two stage button or the second two stage button is in a second activation state.

4. The device of claim 3, wherein:
the first activation stage of either the first or second two stage button is configured to be activated if the roller wheel is pushed laterally with a first amount of force,
the second activation stage of either the first or second two stage button is configured to be activated if the roller wheel is pushed laterally with a second amount of force, and
the second amount of force is larger than the first amount of force.

5. The device of claim 1, wherein the roller wheel is configured to pivot in a first direction to activate the first sensor and pivot in a second direction to activate the second sensor.

6. The device of claim 5, wherein the first pivot direction and the second pivot direction are perpendicular to a rotation direction of the roller wheel.

7. The device of claim 1, wherein the roller wheel is configured to translate in a first direction to activate the first sensor and translate in a second direction to activate the second sensor.

8. The device of claim 7, wherein the first direction and the second direction are lateral directions.

9. The device of claim 7, wherein the first direction and the second direction are perpendicular to a rotation direction of the roller wheel.

10. The device of claim 1, wherein:
the first sensor is configured to control scrolling along a positive direction of the second axis at a first rate if the roller is pivoted in a first direction by a first lateral amount of force,
the second sensor is configured to control scrolling along a negative direction of the second axis at the first rate if the roller is pivoted in a second direction by the first lateral amount of force,
the first sensor is configured to control scrolling along the positive direction of the second axis at a second rate if the roller is pivoted in the first direction by a second lateral amount of force, and
the second sensor is configured to control scrolling along the negative direction of the second axis at the second rate if the roller is pivoted in the second direction by the second lateral amount of force.

11. The device of claim 1, wherein:
the first sensor is a first two stage button, and
the second sensor is a second two stage button.

12. The device of claim 1, wherein:
the first sensor includes a first one stage button and a first force detection device that are mechanically coupled, and
the second sensor includes a second one stage button and a second force detection device that are mechanically coupled.

13. The device of claim 12, wherein:
the first and second force detection devices are configured to control scrolling at a first rate along the second axis if either the first or second force detection devices detect a first amount of force, and
the first and second force detection devices are configured to control scrolling at a second rate along the second axis if either the first or second force detection devices detect a second amount of force greater than the first amount of force.

14. The device of claim 13, wherein the second rate increases with an increased second amount of force.

15. The device of claim 13, wherein the second rate is a function of the second amount of force.

16. The device of claim 13, wherein the second rate is proportional to the second amount of force.

17. The device of claim 1, wherein:
the first sensor is a first force detection device, and
the second sensor is a second force detection device.

18. The device of claim 17, wherein the roller wheel is configured to pivot to transfer forces to the first force detection device and the second force detection device.

19. The device of claim 18, wherein:
the first and second force detection devices are configured to control scrolling at a first rate along the second axis if either the first or second force detection devices detect a first amount of force, and
the first and second force detection devices are configured to control scrolling at a second rate along the second axis if either the first or second force detection devices detect a second amount of force greater than the first amount of force.

20. The device of claim 19, wherein the second rate increases with an increased second amount of force.

21. The device of claim 19, wherein the second rate is a function of the second amount of force.

22. The device of claim 19, wherein the second rate is proportional to the second amount of force.

23. The device of claim 19, wherein the roller wheel is configured to pivot to transfer forces to the first force detection device and the second force detection device.

24. The device of claim 1, wherein the graphical object is displayed on a computer display.

25. The device of claim 1, further comprising:
a first activation arm disposed on the first side of the roller wheel and configured to transfer first lateral forces to the first sensor; and
a second activation arm disposed on the second side of the roller wheel and configured to transfer second lateral forces to the second sensor.

26. The device of claim 1, further comprising:
an axle coupled to the roller wheel configured to transfer lateral forces to the first sensor and the second sensor placed on the roller wheel by the user.

27. The device of claim 1, wherein the roller wheel is configured to laterally translate under the lateral forces to activate the first sensor and the second sensor.

28. The device of claim 1, wherein the first axis is the y-axis of a monitor, and the second axis is the x-axis of a monitor.

29. A mouse device including the roller device according to claim 1.

30. A roller device comprising:
a roller;
a first detector configured to be activated if the roller is moved in a first direction; and
a second detector configured to be activated if the roller is moved in a second direction, wherein:
if the first detector or the second detector is activated, the first detector and the second detector are configured to control a scrolling rate of a graphical object based on an amount of force placed on the roller by a user,
the roller is configured to be moved in a third direction, which is perpendicular to the first direction and the second direction, to activate the first detector and the second detector,
if the first detector and the second detector are activated, the first detector and the second detector are configured to change a control characteristic of the roller device being rotated from a first characteristic to a second characteristic, and the first control characteristic of the roller device being rotated is for cursor control and the second control characteristic of the roller device being rotated is for scrolling control.

31. The device of claim 30, a third detector configured to be activated if the roller is moved in a third direction.

32. The device of claim 30, further comprising a pivot link coupled to the roller, wherein the movement is pivoting movement.

33. The device of claim 32, wherein the pivoting movement includes a left pivoting movement, a right pivoting movement, and a back pivoting movement.

34. The device of claim 33, wherein the left pivoting movement is the first direction and the second pivoting movement is the second direction.

35. The device of claim 32, wherein the pivoting movement includes a left pivoting movement, a right pivoting movement, and a forward pivoting movement.

36. The device of claim 35, wherein the left pivoting movement is the first direction and the second pivoting movement is the second direction.

37. The device of claim 30, wherein the movement is translational movement.

38. The device of claim 30, wherein:
the first detector is a first two-stage button and configured to control a first direction of x-scrolling of a graphical object, wherein the first direction of x-scrolling is at a first scrolling rate if the first two-stage button is in a first stage and is at a second scrolling rate if the first two-stage button is in a second stage, and
the second detector is a second two-stage button configured to be activated if the roller is pivoted in a second direction and configured to control a second direction of x-scrolling of a graphical object, wherein the second direction of x-scrolling is at the first scrolling rate if the second two-stage button is in the first stage and is at a second scrolling rate if the second two-stage button is in the second stage.

39. The device of claim 30, wherein:
the first detector includes a first force detection device, and
the second detector includes a second force detection device.

40. The device of claim 39, wherein:
the first detector includes a first one-stage button coupled to the first force detection device, and
the second detector includes a second one-stage button coupled to the second force detection device.

41. The device of claim 39, wherein the force detection devices are configured to control the scrolling rate based on an amount of force detected by the force detection devices.

42. The device of claim 39, wherein the scrolling rate is proportional to forces detected by the force detection devices.

43. A method for scrolling a graphical object along a first axis and a second axis, the method comprising:
scrolling the graphical object along the first axis if a roller wheel of a mouse is rotated by a user;
scrolling the graphical object along the second axis at a first rate if a first sensor or a second sensor detects a first amount of lateral force placed on the roller wheel by a user;
scrolling the graphical object along the second axis at a second rate if one of the first sensor and the second sensor detects a second amount of lateral force placed on the roller wheel by the user;
moving a cursor if the mouse is moved relative to a work surface if the first sensor and the second sensor are not pressed at the same time; and
scrolling the graphical object if the mouse is moved relative to the work surface and the first sensor and the second sensor are pressed at the same time.

44. The method of claim 43, wherein the first force is less than the second force, and the first rate is less than the second rate.

45. The method of claim 43, further comprising
tilting the roller wheel in a first direction to activate the first sensor; and
tilting the roller wheel in a second direction to activate the second sensor.

46. The method of claim 43, further comprising
laterally translating the roller wheel in a first direction to activate the first sensor; and
laterally translating the roller wheel in a second direction to activate the second sensor.

47. The method of claim 43, wherein the first sensor and the second sensor are configured to detect the first amount of lateral force and the second amount of lateral force without tilting or translating of the roller wheel.

48. The device of claim 43, wherein the second rate is proportional to the second amount of lateral force.

49. The method of claim 43, wherein the first axis is the y-axis of a monitor, and the second axis is the x-axis of the monitor.

* * * * *